United States Patent Office 3,084,175
Patented Apr. 2, 1963

3,084,175
15-HALO-16 ALKYL AND ALKYLENE DERIVATIVES OF THE PREGNANE SERIES
Norman L. Wendler, Summit, and David Taub, Metuchen, N.J., assignors to Merck & Co., Inc., Rahway, N.J., a corporation of New Jersey
No Drawing. Filed July 21, 1960, Ser. No. 44,267
16 Claims. (Cl. 260—397.45)

This invention relates to novel steroids. More specifically, this invention relates to 15-halo-16-alkylidene and 15-halo-16-alkyl $\Delta^{15}$ steroids of the cortisone and prednisone type. Such compounds can be illustrated by the following formulae:

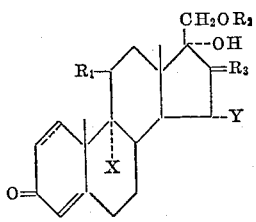

and

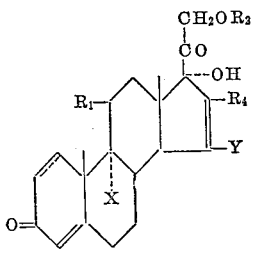

in which $R_1$ may be keto or $\beta$-hydroxyl, $R_2$ may be hydrogen or lower alkanoyl, $R_3$ is alkylidene, $R_4$ is alkyl of the same number of carbons as $R_3$, X may be hydrogen or halogen, and Y is a halogen; the dotted line in ring A indicating either a single or a double bond between carbons 1 and 2.

The 15-halo-16-alkylene and 15-halo-16-alkyl $\Delta^{15}$ steroids produced in accordance with the present invention possess extremely high anti-inflammatory activity, considerably greater than that of the parent steroids, and are are especially effective for the treatment of arthritis and related diseases since they can be administered for their cortisone-like action in low dosage thereby minimizing undesired side effects.

The new products of our invention are prepared by starting from the known 16-alkyl pregnenones and pregnadienones having 3,20-keto groups, $17\alpha$ and 21 hydroxyls, and which are oxygenated at carbon #11. Examples of such starting materials include $9\alpha$-fluoro-$11\beta,17\alpha,21$-trihydroxy-$16\alpha$-methyl-1,4-pregnadiene-3,20-dione;
$9\alpha$-fluoro-$11\beta,17\alpha,21$-trihydroxy-$16\beta$-methyl-1,4-pregnadiene-3,20-dione;
$11\beta,17\alpha,21$-trihydroxy-$16\alpha$-methyl-1,4-pregnadiene-3,20-dione;
$11\beta,17\alpha,21$-trihydroxy-$16\beta$-methyl-1,4-pregnadiene-3,20-dione;
$17\alpha,21$-dihydroxy-$16\alpha$-methyl-1,4-pregnadiene-3,11,20-trione;
$9\alpha$-fluoro-$11\beta,17\alpha,21$-trihydroxy-$16\alpha$-methyl-4-pregnene-3,20-dione;
$9\alpha$-fluoro-$11\beta,17\alpha,21$-trihydroxy-$16\beta$-methyl-4-pregnene-3,20-dione;
$11\beta,17\alpha,21$-trihydroxy-$16\alpha$-methyl-4-pregnene-3,20-dione;
$11\beta,17\alpha,21$-trihydroxy-$16\beta$-methyl-4-pregnene-3,20-dione;
$17\alpha,21$-dihydroxy-$16\alpha$-methyl-4-pregnene-3,11,20-trione;
$17\alpha,21$-dihydroxy-$16\beta$-methyl-4-pregnene-3,11,20-trione and the like.

The compounds of our invention are made by a series of reactions which are illustrated in the schematic chemical flow sheet of Table 1. The details of the reaction conditions are given in the examples and most of the intermediates have been disclosed and claimed elsewhere.

In the compounds of our invention, it can be seen that ring A may have 1 or 2 double bonds, being either $\Delta^4$ or $\Delta^{1,4}$ steroids. Similarly, the substituent on carbon 9 may be hydrogen or a halogen, preferably fluorine. The oxygenated substituent on carbon 11 may be a $\beta$-hydroxy or a keto group. $R_2$ may be hydrogen or a lower alkanoyl, an acetyl, propionyl, butyryl or the like. Preferably, $R_2$ is acetyl when the $C_{21}$ hydroxyl is acylated. The substituent on carbon 16 is either $R_3$ or $R_4$, depending on the position of the double bond, since $R_4$ is an alkyl and $R_3$ is an alkylidene of the same number of carbons. Preferably, this substituent has one carbon and is thus methylene or methyl, as the case may be. The substituent on $C_{15}$ is a halogen. This is the main point of novelty by which our invention distinguishes over compounds claimed elsewhere. Preferably, this halogen is fluorine, although it may be bromine or chlorine.

The 15-halo-16-alkylene and 15-halo-16-alkyl $\Delta^{15}$ steroids of our invention possess extremely high antiinflammatory activity and may be administered orally, parenterally or topically. Thus, the active ingredient can be administered alone or may be associated with a carrier. A smaller quantity of the active steroid of our invention may be administered to the patient and have the same therapeutic effect as larger quantities of other steroids such as cortisone or hydrocortisone. Any of the carriers used in pharmaceutical practice may be employed where there is no incompatibility with the active materials. The composition may take the form of tablets, powders, capsules, elixers, syrups or other dosage forms which are particularly useful for oral ingestion. Liquid diluents are employed in sterile condition for parenteral use, namely, by injection. Such a medium may be a sterile solvent for the active material. For topical administration any of the known dermatologic vehicles may be employed. Such vehicles for external application include water-soluble ointment bases, oil, petrolatum and jellies.

TABLE 1

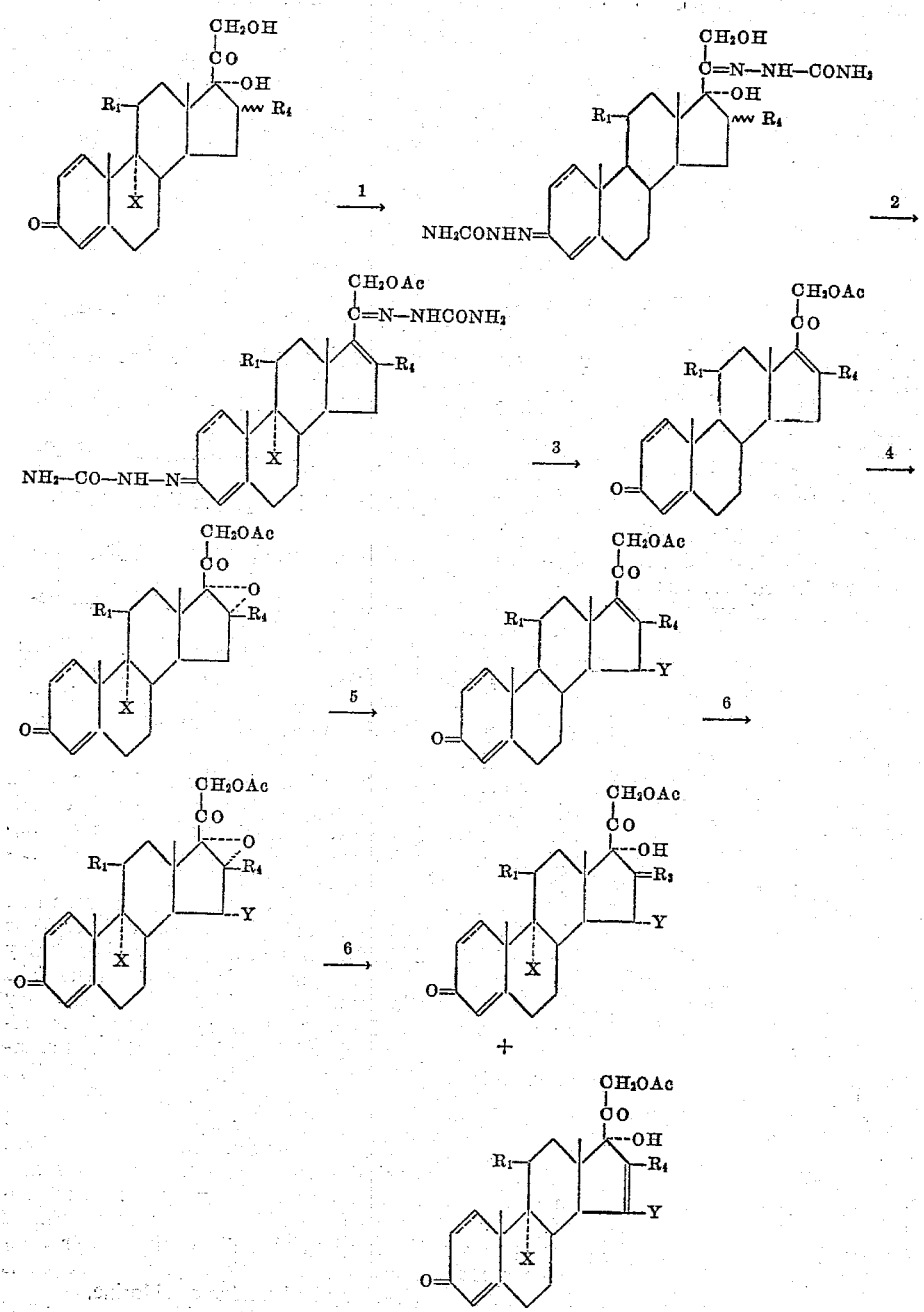

Definitions:
 $R_1$=keto or β-hydroxyl
 Ac=acetyl
 $R_4$=alkyl
 $R_3$=alkylidene
 X=H or halogen
 Y=halogen Reaction conditions:
 (1) Semicarbazide base plus hydrochloride
 (2) Acetic acid plus acetic anhydride
 (3) Hot aqueous acetic acid
 (4) Organic peracid
 (5) $BF_3$ or HF in tetrahydrofuran (Y=F) HBr or HCl in acetic acid (Y=Br or Cl)
 (6) Strong acid (HBr, HCl, HF, $HClO_4$, $CF_3COOH$ etc.)

Our invention can be illustrated by the following examples:

*Example 1*

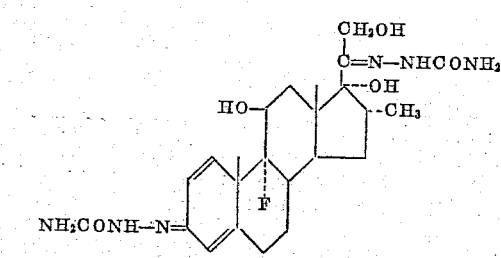

A mixture of 1.00 g. of 9α-fluoro-11β,17α,21-trihydroxy-16α-methyl-1,4-pregnadiene-3,20-dione, 750 mg. of semicarbazide base, 280 mg. of semicarbazide hydrochloride in 20 ml. of methanol and 10 ml. of dimethylformamide is refluxed for 20 hours under nitrogen. The mixture is cooled to 20° C. and 100 ml. of water is added with stirring. The precipitated 3,20-disemicarbazone of 9α-fluoro-11β,17α,21-trihydroxy-16α-methyl-1,4 - pregnadiene-3,20-dione is filtered, washed with water, and dried in air.

In similar manner, when the appropriate steroid is substituted for the starting steroid in the above procedure, there are prepared the 3,20-disemicarbazone of 9α-fluoro - 11β,17α,21 - trihydroxy-16β-methyl-1,4-pregnadiene-3,20-dione,3,20-disemicarbazone of 11β,17α,21-trihydroxy-16α-methyl-1,4-pregnadiene-3,20-dione;
3,20-disemicarbazone of 11β,17α,21-trihydroxy - 16β-methyl-1,4-pregnadiene-3,20-dione;
3,20-disemicarbazone of 17α,21-dihydroxy-16α-methyl-1,4-pregnadiene-3,11,20-trione;
3,20-disemicarbazone of 17α,21-dihydroxy-16β-methyl-1,4-pregnadiene-3,11,20-trione;
3,20-disemicarbazone of 9α-fluoro-11β,17α,21 - trihydroxy-16α-methyl-4-pregnene-3,20-dione;
3,20-disemicarbazone of 9α-fluoro-11β,17α,21 - trihydroxy-16β-methyl-4-pregnene-3,20-dione;
3,20-disemicarbazone of 11β,17α,21-trihydroxy - 16α-methyl-4-pregnene-3,20-dione;
3,20-disemicarbazone of 11β,17α,21-trihydroxy - 16β-methyl-4-pregnene-3,20-dione;
3,20-disemicarbazone of 17α,21-dihydroxy-16α-methyl-4-pregnene-3,11,20-trione and
3,20-disemicarbazone of 17α,21-dihydroxy-16β-methyl-4-pregnene-3,11,20-trione.

*Example 2*

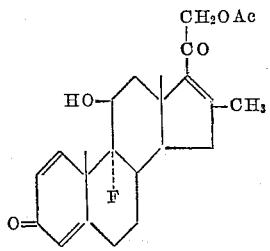

A solution of 500 mg. of the 3,20-disemicarbazone of 9α-fluoro-11β,17α,21-trihydroxy-16α-methyl-1,4 - pregnadiene-3,20-dione in 10 ml. of acetic acid and 0.5 ml. acetic anhydride is refluxed under nitrogen for one hour to produce the corresponding 3,20-disemicarbazone of 9α-fluoro-11β,21-dihydroxy-16-methyl-1,4,16 - pregnatriene-3,20-dione 21-acetate. The reaction mixture is cooled, 13 ml. of water is added and the mixture heated on the steam bath for 5 hours. It is then concentrated in vacuo nearly to dryness and water and chloroform added. The mixture is thoroughly extracted with chloroform, and the chloroform extract washed with excess aqueous potassium bicarbonate, saturated salt solution and dried over magnesium sulfate. Chromatography of the residue on neutral alumina and crystallization of pertinent benzene-chloroform fractions gives 9α-fluoro-11β,21-dihydroxy-16-methyl-1,4,16-pregnatriene-3,20-dione 21-acetate.

Similarly, when the 3,20-disemicarbazone of 9α-fluoro-11β,17α,21 - trihydroxy - 16β - methyl - 1,4 - pregnadiene-3,20-dione is substituted in the above procedure for the starting material, one obtains 9α-fluoro-11β,21-dihydroxy-16-methyl-1,4,16-pregnatriene-3,20-dione 21 acetate.

In a similar manner, 11β,21-dihydroxy-16-methyl-1,4-pregnatriene-3,20-dione 21-acetate; 21-hydroxy-16-methyl-1,4,16-pregnatriene-3,11,20-trione 21-acetate; 9α-fluoro - 11β,21 - dihydroxy - 16 - methyl - 4,16 - pregnadiene-3,20-dione 21-acetate; 11β,21-dihydroxy-16-methyl-4,16-pregnadiene-3,20-dione 21-acetate; and 21-hydroxy-16-methyl-4,16-pregnadiene-3,11,20-trione 21-acetate are obtained by starting with the appropriate 3,20-disemicarbazone in the above procedure.

*Example 3*

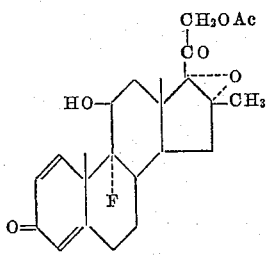

To a stirred solution of 500 mg. of 9α-fluoro-11β,21-dihydroxy - 16 - methyl - 1,4,16 - pregnatriene - 3,20-dione 21-acetate in 15 ml. of methylene chloride at 0° are added 8 g. of disodium hydrogen phosphate and 2 ml. of 2 M peroxytrifluoracetic acid in methylene chloride. After 10 minutes at 0° and 25° for one hour, water is added and the mixture thoroughly extracted with methylene chloride. The latter extract is washed with saturated aqueous sodium chloride and dried over magnesium sulfate. Evaporation of the solvent and crystallization of the residue from acetone-ether gives 9α-fluoro-11β,21-dihydroxy - 16β - methyl - 16α,17α - oxido - 1,4 - pregnadiene-3,20-dione 21-acetate.

In a similar manner, by substituting the appropriate 16-methyl-Δ16-steroid in the above procedure, there are prepared 11β,21-dihydroxy-16β-methyl-16α,17α-oxido-1,4-pregnadiene-3,20-dione 21-acetate; 21-hydroxy-16β-methyl - 16α,17α - oxido - 1,4 - pregnadiene - 3,11,20 - trione 21-acetate; 9α-fluoro-11β,21-dihydroxy-16β-methyl-16α,17α,-oxido-pregnene-3,20-dione 21-acetate; 11β,21-dihydroxy-16β-methyl, 16α,17α-oxido-4-pregnene-3,20-dione 21-acetate, and 21-hydroxy-16β-methyl-16α,17α-oxido-4-pregnene-3,11,20-trione 21-acetate.

*Example 4*

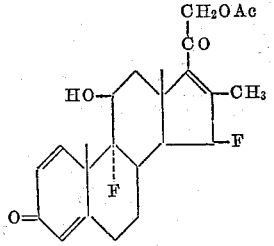

To a mixture of 325 mg. of 9α-fluoro-11β,21-dihydroxy-16β-methyl-16α,17α-oxido, 1,4-pregnadiene-3,20-dione 21-acetate in 1.5 ml. of tetrahydrofuran at —60° C. in a polyethylene centrifuge tube there is added 1.77 ml. of a 2–1 by weight mixture of hydrogen fluoride in tetrahydrofuran. The mixture is kept for 2.5 hours at 15–20° C. It is then poured into an excess (about 25 ml.) of cold 5% aqueous sodium carbonate and 25 ml. of chloroform. The chloroform is separated and washed with water followed by saturated sodium chloride solution. The chloroform solution is then dried over magnesium sulfate and the solvent is removed under a vacuum. The residue is placed on six sheets of Whatman #3 filter paper (6″ x 20″) using formamide as the stationary phase and benzene as the eluting phase. The paper is dried and the appropriate band is cut out. The desired product is then extracted from this band with methanol. The solvent is evaporated under a vacuum and the product is recrystallized from acetone and ether.

When there is substituted for the oxido steroid used above as the starting material an equivalent quantity of 11β,21 - dihydroxy - 16β - methyl - 16α,17α - oxido - 1,4-pregnadiene-3,20-dione 21-acetate; 21-hydroxy-16β-methyl - 16α,17α - oxido - 1,4 - pregnadiene - 3,11,20 - trione-21-acetate; 9α-fluoro-11β,21-dihydroxy-16β-methyl-16α, 17α-oxido-4-pregnene-3,20-dione 21-acetate; 11β,21-dihydroxy - 16β - methyl - 16α,17α - oxido - 4 - pregnene-3,20-dione 21-acetate or 21-hydroxy-16β-methyl-16α,17α- oxido-4-pregnene-3,11,20-trione 21-acetate, the corresponding 15-fluoro steroid is obtained.

Example 5

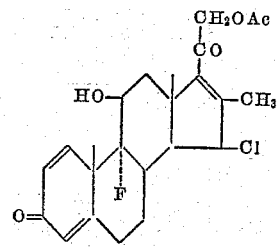

To a solution of 5.00 grams of 9α-fluoro-11β,21-dihydroxy - 16β - methyl - 16α,17α - oxido - 1,4 - pregnadiene-3,20-dione 21-acetate (product of Example 3) in 25 ml. of acetic acid there is added 25 ml. of 5% hydrogen chloride in acetic acid. The mixture is stirred 4 hours at 25° C. The solution is then concentrated to dryness in vacuo and the residue is flushed several times with benzene. The residue is subjected to partition chromatography on 200 g. of Celite with formamide as the stationary phase and benzene as the eluting phase. 9α - fluoro - 15 - chloro - 16 - methyl - 11β,21 - dihydroxy-1,4,16-pregnatriene-3,20-dione 21-acetate is obtained as the first substance eluted from the column and is crystallized from acetone-ether.

When there is substituted for the oxido steroid used above as the starting material an equivalent quantity of 11β,21 - dihydroxy - 16α,17α - oxido - 1,4 - pregnadiene-3,20-dione 21 acetate; 21-hydroxy-16β-methyl-16α-17α-oxido-1,4-pregnadiene-3,11,20-trione 21 acetate; 9α-fluoro-11β,21 - dihydroxy - 16α - methyl - 16α,17α - oxido - 4-pregnene - 3,20 - dione 21 - acetate; 11β,21 - dihydroxy-16β - methyl - 16α,17α - oxido - 4 - pregnene - 3,20 - dione 21 acetate or 21-hydroxy-16β-methyl-16α,17α-oxido-4-pregnene-3,11,20-trione 21 acetate, the corresponding 15-chloro steroid is obtained.

Example 6

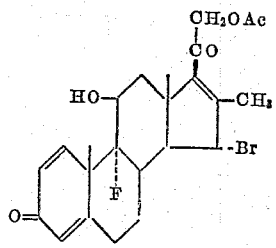

To a stirred solution of 5.05 g. of 9α-fluoro-11β,21-dihydroxy - 16β - methyl - 16α,17α - oxido - 1,4 - pregnadiene-3,20-dione 21 acetate in 75 ml. of acetic acid maintained at 10–15° C., there is added 25 ml. of cold 15% hydrogen bromide in acetic acid. After 35 minutes, the mixture is concentrated to dryness in vacuo and the residue is chromatographed on 200 g. of neutral alumina. From the petroleum ether-benzene eluates, there is obtained 9α - fluoro - 15α - bromo - 16 - methyl - 11α,21-dihydroxy-1,4,16-pregnatriene-3,20-dione 21-acetate, crystallized from acetone-ether.

When there is substituted for the oxido steroid used above as the starting material an equivalent quantity of 11β,21 - dihydroxy - 16α,17α - oxido - 1,4 - pregnadiene-3,20-dione 21 acetate; 21-hydroxy-16β-methyl-16α,17α-oxido-1,4-pregnadiene-3,11,20-trione 21 acetate; 9α-fluoro-11β,21 - dihydroxy - 16β - methyl - 16α,17α - oxido - 4-pregnene - 3,20 - dione 21 acetate; 11β,21 - dihydroxy-16β - methyl - 16α,17α - oxido - 4 - pregnene - 3,20 - dione 21 acetate or 21-hydroxy-16β-methyl-16α,17α-oxido-4-pregnene-3,11,20-trione 21 acetate, the corresponding 15-bromo steroid is obtained.

Example 7

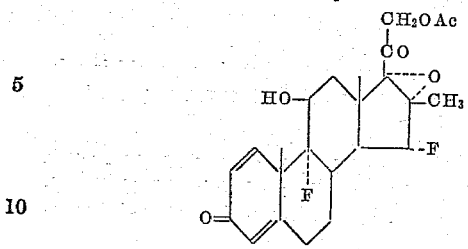

To a well-stirred solution of 2.00 g. of 16-methyl-9α,15α - difluoro - 1,4,16 - pregnatriene - 11β,17α,21 - trihydroxy-3,20-dione 21 acetate in 60 ml. of methylene chloride is added 30 g. of disodium hydrogen phosphate. The mixture is cooled to 0° and 5 ml. of a 2 molar solution of peroxytrifluoroacetic acid in methylene chloride is added through a dropping funnel at a fast dropping rate. The mixture is stirred at 0° for 10 minutes and at 25° for one hour.

Methylene chloride and water are added. The mixture is extracted three times with methylene chloride. The latter extract is washed with water, saturated sodium chloride solution and dried over magnesium sulfate. Removal of the solvent leaves a residue which is crystallized from acetone-ether to give the difluoro-16β-methyl-16α,17α-oxide.

When the 15α-chloro compounds described in Example 5 or the 15α-bromo compounds described in Example 6 are substituted in equivalent quantities for the 15α-fluoro compound used above as a starting material, the corresponding 15α-chloro or bromo-16α,17α-oxido steroid is obtained. Similarly, when any of the other 15α-fluoro steroids obtained in Example 4 are substituted in the above procedure, the corresponding 15α-fluoro-16α,17α-oxido steroid is obtained.

Example 8

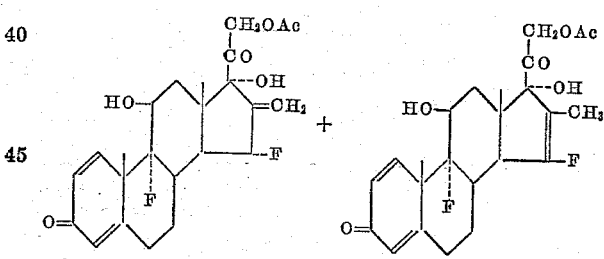

To a stirred solution of 800 mg. of 9α,15α-difluoro-11β,21 - dihydroxy - 16β - methyl - 16α,17α - oxido - 1,4-pregnadiene-3,20-dione-21-acetate (product of Example 7) in 10 ml. of glacial acetic acid at 15° C. is added 10 ml. of 7% hydrogen chloride in acetic acid at 15° C. (Alternatively similar results are obtained with 800 mg. of the starting compound in 5 ml. of acetone and 1 ml. of conc. HCl cooled to 10–15° C.) In either case, after 20 minutes at 10–15° C., water is added and the solid product is filtered, washed with water and dried in air to give a mixture of the corresponding 15-fluoro-Δ15-16-methyl-17α-hydroxy and 15-fluoro-16-methylene-17α-hydroxy steroids. This mixture is separated into its components by chromatography on Whatman #3 filter paper (40 mg. per 6" x 20" sheet) utilizing formamide as the stationary phase and chloroform-benzene (1:9) as the mobile phase. The appropriate band (visible under ultraviolet light) is cut out, eluted with methanol, and the methanol is concentrated to dryness in vacuo. Water is added to the residue and the solid is filtered, washed with water and dried in air. Pure crystalline material is obtained in each case by crystallization from ethyl acetate-hexane or acetone-ether, the products being respectively 9α,15α-difluoro-16-methylene-11β,17α,21-trihydroxy - 1,4 - pregnadiene - 3,20 - dione - 21 - acetate and 9α,15 - difluoro - 16 - methyl - 11β,17α,21 - trihydroxy - 1,4,15 - pregnatriene - 3,20 - dione - 21 - acetate.

When the various 15α-chloro or bromo compounds, formed by the process of Example 7 from the various products of Examples 5 and 6, are substituted as starting materials for the 15α-fluoro compounds used above in the above process, the corresponding 15α-chloro and 15α-bromo compounds are obtained.

*Example 9*

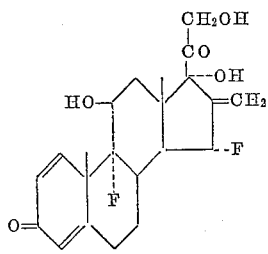

and

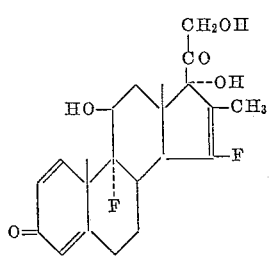

Either compound is obtained by treatment of 200 mg. of the corresponding 21-acetate (the product of Example 8) in 10 ml. of methanol with 200 mg. of potassium bicarbonate in 3 ml. of water under nitrogen at reflux of 10 minutes. The mixture is cooled, neutralized with 0.3 ml. of acetic acid in 5 ml. of water, the methanol removed in vacuo and the product extracted into ethyl acetate. Concentration of the ethyl acetate gives respectively crystalline 9α,15α-difluoro-11β,17α,21-trihydroxy-16-methylene-1,4-pregnadiene-3,20-dione or 9α,15-difluoro-11β,17α,21-trihydroxy-16-methyl-1,4,15-pregnatriene-3,20-dione.

In a similar manner there are obtained

15α-fluoro-11β,17α,21-trihydroxy-16-methylene-1,4-pregnadiene-3,20-dione;
15α-fluoro17α,21-dihydroxy-16-methylene-1,4-pregnadiene-3,11,20-trione;
9α,15α-difluoro-11β,17α,21-trihydroxy-16-methylene-4-pregnene-3,20-dione;
15α-fluoro-11β,17α,21-trihydroxy-16-methylene-4-pregnene-3,20-dione;
15α-fluoro-17α,21-dihydroxy-16-methylene-4-pregnene-3,11,20-trione;
15α-bromo-11β,17α,21-trihydroxy-16-methylene-1,4-pregnatriene-3,20-dione;
15α-chloro-17α,21-dihydroxy-16-methylene-1,4-pregnadiene-3,11,20-trione;
9α-fluoro-15α-bromo-11β,17α,21-trihydroxy-16-methylene-4-pregnene-3,20-dione; and
15α-chloro-11β,17α,21-trihydroxy-16-methylene-4-pregnene-3,20-dione and the corresponding Δ¹⁵-16-methyl compounds.

We claim as our invention:

1. Compounds of the structure:

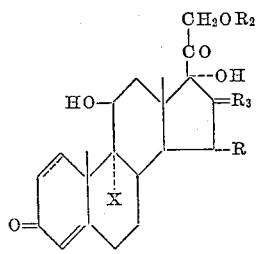

in which $R_2$ is selected from the group consisting of hydrogen and lower alkanoyl, $R_3$ is lower alkylidene, X is selected from the group consisting of hydrogen and fluorine, Y is a halogen and the dotted line in ring A indicates that the bond joining carbons No. 1 and No. 2 is selected from the group consisting of a single bond and a double bond.

2. 15α-fluoro-16-methylene-17α,21-dihydroxy-4-pregnene-3,11,20-trione.
3. 9α,15α-difluoro-16-methylene-11β,17α,21-trihydroxy-4-pregnene-3,20-dione.
4. 15α-fluoro-16-methylene-11β,17α,21-trihydroxy-4-pregnene-3,20-dione.
5. 15α-fluoro-16-methylene-17α,21-dihydroxy-1,4-pregnadiene-3,11,20-trione.
6. 9α,15α-difluoro-16-methylene-11β,17α,21-trihydroxy-1,4-pregnadiene-3,20-dione.
7. 15α-fluoro-16-methylene-11β,17α,21-trihydroxy-1,4-pregnadiene-3,20-dione.
8. 15-fluoro-16-methyl-17α,21-dihydroxy-4,15-pregnadiene-3,11,20-trione.
9. 9α,15-difluoro-16-methyl-11β,17α,21-trihydroxy-4,15-pregnadiene-3,20-dione.
10. 15-fluoro-16-methyl-11β,17α,21-trihydroxy-4,15-pregnadiene-3,20-dione.
11. 15-fluoro-16-methyl-17α,21-dihydroxy-1,4,15-pregnatriene-3,11,20-trione.
12. 9α,15-difluoro-16-methyl-11β,17α,21-trihydroxy-1,4,15-pregnatriene-3,20-dione.
13. 15-fluoro-16-methyl-11β,17α,21-trihydroxy-1,4,15-pregnatriene-3,20-dione.
14. Compounds of the formula:

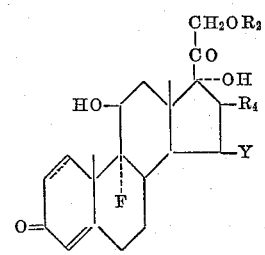

in which $R_2$ is selected from the group consisting of hydrogen and lower alkanoyl, $R_4$ is alkyl, X is selected from the group consisting of hydrogen and fluoro, Y is a halogen, and the dotted line in ring A indicates that the bond joining carbons No. 1 and No. 2 is selected from the group consisting of a single bond and a double bond.

15. Compounds of the structure:

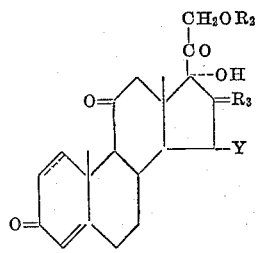

in which $R_2$ is selected from the group consisting of hydrogen and lower alkanoyl, $R_3$ is lower alkylidene, Y is a halogen and the dotted line in ring A indicates that the bond joining carbons No. 1 and No. 2 is selected from the group consisting of a single bond and a double bond.

16. Compounds of the formula:
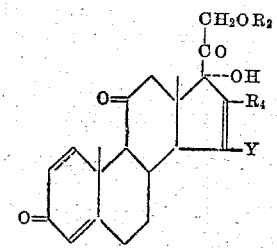
in which $R_2$ is selected from the group consisting of hydrogen and lower alkanoyl, $R_4$ is alkyl, Y is a halogen and the dotted line in ring A indicates that the bond joining carbons No. 1 and No. 2 is selected from the group consisting of a single bond and a double bond.
No references cited.